(12) United States Patent
Cocayne

(10) Patent No.: US 8,662,784 B2
(45) Date of Patent: Mar. 4, 2014

(54) PAD-EYE PIN AND RETAINER

(75) Inventor: Michael J Cocayne, Dubuque, IA (US)

(73) Assignee: Deere & Company, Moline, IL (US)

( * ) Notice: Subject to any disclaimer, the term of this patent is extended or adjusted under 35 U.S.C. 154(b) by 1788 days.

(21) Appl. No.: 11/345,533

(22) Filed: Feb. 1, 2006

(65) Prior Publication Data

US 2007/0189846 A1 Aug. 16, 2007

(51) Int. Cl.
*B60D 1/00* (2006.01)

(52) U.S. Cl.
USPC .......................................................... 403/154

(58) Field of Classification Search
USPC ............. 403/151, 150, 154; 411/351; 24/453, 24/DIG. 52
See application file for complete search history.

(56) References Cited

U.S. PATENT DOCUMENTS

| | | | | |
|---|---|---|---|---|
| 1,107,881 A * | 8/1914 | Berntsen et al. | ............... | 403/247 |
| 1,887,964 A * | 11/1932 | Steele | ........................... | 403/150 |
| 2,642,915 A * | 6/1953 | Jellison | ........................ | 152/237 |
| 2,738,151 A * | 3/1956 | Herzog | ............................ | 248/55 |
| 3,200,690 A * | 8/1965 | Dickman | ....................... | 411/337 |
| 3,245,705 A * | 4/1966 | Fangman | ....................... | 403/154 |
| 3,934,676 A * | 1/1976 | Rice | ............................ | 182/182.3 |
| 4,511,304 A * | 4/1985 | Woodruff | ....................... | 414/546 |
| 4,629,353 A * | 12/1986 | Burke | ............................ | 403/154 |
| 5,061,133 A * | 10/1991 | May et al. | ...................... | 411/340 |
| 5,135,247 A * | 8/1992 | Alfaro et al. | ................. | 280/415.1 |
| 6,116,633 A * | 9/2000 | Pride | ............................. | 280/511 |
| 6,834,879 B1* | 12/2004 | Lorman | ........................ | 280/506 |
| D557,544 S * | 12/2007 | Mashinske | ...................... | D6/570 |
| 2001/0054807 A1* | 12/2001 | Homan et al. | ................. | 280/515 |
| 2005/0005384 A1* | 1/2005 | Finley | ............................. | 15/161 |

OTHER PUBLICATIONS

Color Photograph of a GD675A-2C Komatsu Motor Grader taken early part of 2002 by Michael T. Gacioch, Product safety and Compliance, John Deere Dubuque, Iowa.

* cited by examiner

*Primary Examiner* — Joshua Kennedy
(74) *Attorney, Agent, or Firm* — Faegre Baker Daniels LLP

(57) ABSTRACT

An articulated vehicle joint including an improved locking pin having a removable upper retainer. The articulated vehicle includes a first frame member and a second frame member pivotable about a hinge point relative to the first frame member. The locking pin is configured to prevent the second frame member from pivoting about the hinge point relative to the first frame member.

16 Claims, 3 Drawing Sheets

PAD-EYE PIN AND RETAINER

BACKGROUND AND SUMMARY OF THE INVENTION

Several types of heavy machines incorporate articulated frames. Examples of articulated frames include wheeled tree harvesters, wheeled loaders, articulated compaction machines and motor graders. It is advantageous under some circumstances to prevent articulation of the machine. An articulation lock preserves the relative position of the parts of the machine frame: generally a two-part frame and prevents articulation.

As a class, heavy machines are those frequently used for earth movement, civil works, agriculture, and construction applications.

In the case of a motor grader, an operator may wish to prevent articulation to complete certain operations. Since the motor grader has steerable front wheels, directional control of the motor grader can be maintained while articulation is limited. On the machines making use of articulation for steering, the articulation lock may be used while transporting the heavy machine by truck or rail. Further utility arises from use of the articulation lock by service mechanics when working on the vehicle, particularly when working in the vicinity of the articulated joint.

Known articulation locks make use of an upper, lower pad-eye on a first portion of the articulated frame and a center pad-eye on a second portion of the articulated frame with an appropriately sized pin. In the locked position the pin is placed through the upper, center and lower pad-eye to prevent articulation of the portions of the vehicle frame. While for convenience of explanation and illustration the invention is described in terms of an upper, lower, and center pad-eyes, an articulated joint may comprise a plurality of pad-eyes not dissimilar from a hinge.

Steering of articulated heavy vehicles is generally accomplished by hydraulic cylinders positioned so as to alternatively push or pull one frame part to angularly rotate the frame part about a hinge point. The hinge point generally comprises a vertical hinge pin(s) in a plurality of pad-eyes located along the vehicle front-to-rear mid-line.

The articulation lock is generally located laterally from the hinge point at a location approximately orthogonal to the vehicle front-to-rear mid-line. Known pins 40 incorporate a through-hole and a roll pin extending beyond the diameter of the lock pin, or a washer 42 welded to the top of the lock pin or a similar feature used as a retainer to keep the pin in the articulation lock from falling through the articulation lock because the influence of gravity. Known retaining features such as roll pins are incapable of removal from the lock pin without requiring hand tools such as a hammer and drift punch. While such features serve the function of resisting the influence of gravity on the lock pin, removal of the lock pin can be complicated by the presence of the retainer.

When it is desired to remove the lock pin having a retainer feature it is necessary to lift the pin vertically as the retainer feature performs its function to prevent the lock pin from falling downward out of the pad-eyes forming the articulation lock. Unless the articulated frame members are positioned in near perfect alignment, the articulation lock pin may be held in position by the transverse pressure applied across the pad-eyes. Thus for a single individual, removal of the lock pin may involve incrementally adjusting the steering of the heavy vehicle in effort to find a position where no transverse pressure is applied to the lock pin. This effort to locate a position of no transverse pressure may involve a few, or many trips from the operator station, back to the location of the lock pin, only to be frustrated that the pin was not movable by muscle power.

Alternatively, removal of the lock pin may be a two-person operation with an operator incrementally changing the position of the articulated frames by operating the hydraulic steering mechanism, while an assistant maintains vertical force on the lock pin to remove the same. While this two-person sequence may be faster as it saves the operator's time and effort of repeatedly climbing from the lock pin location to the operator station, it suffers from the disadvantage of requiring an assistant and more importantly places the assistant in a vulnerable position on a possibly wiggling heavy vehicle.

The instant invention provides an improved articulation lock primarily by providing an improved lock pin retaining device and system. Removal of the retainer may be accomplished without the need for tools. The articulation lock may be removed with the assistance of gravity, without repeated operator effort climbing from the lock pin location to the operator station, and without placing an assistant in a hazardous location on the heavy machine.

DESCRIPTION OF A PREFERRED EMBODIMENT

Figure 1:
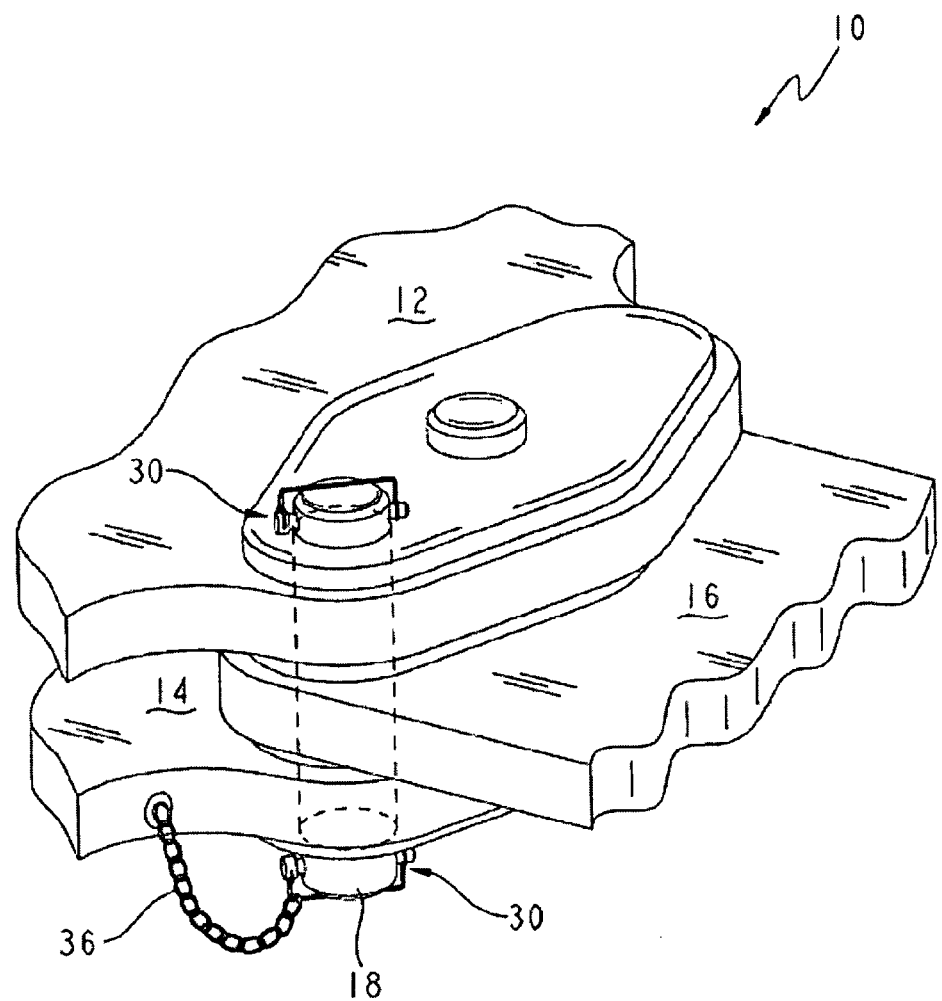
FIG. 1 depicts an articulation lock including upper, lower and middle pad-eyes.
Figure 2:
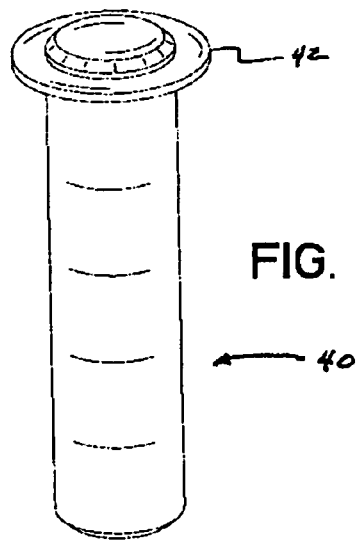
FIG. 2 depicts an articulation lock pin of a conventional type.
Figure 3:
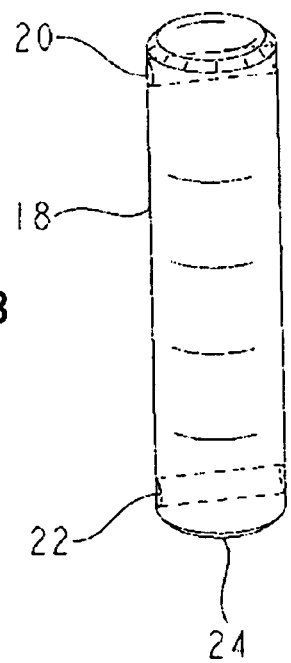
FIG. 3 depicts an inventive lock pin for an articulation joint.
Figure 4:
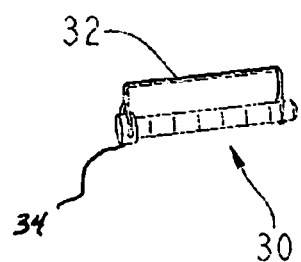
FIG. 4 depicts a known safety retainer pin assembly.
Figure 5:
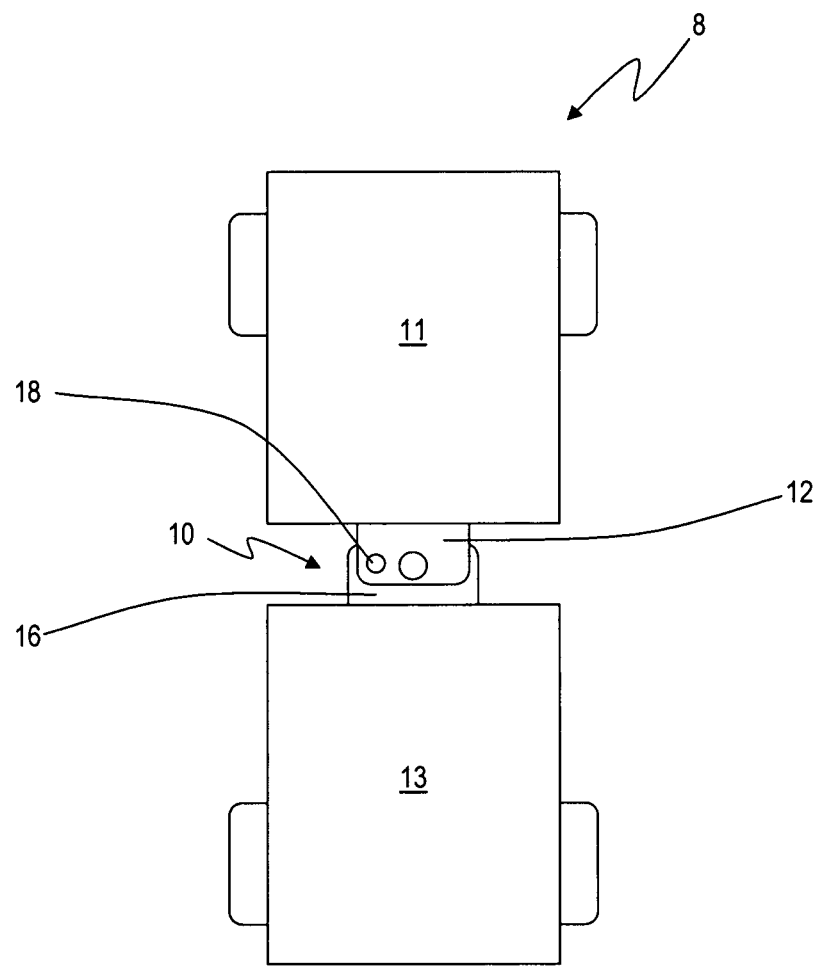
FIG. 5 is a top diagrammatic view of a vehicle having an articulation lock.

The invention is further described in terms of an embodiment of an articulated joint of a heavy machine or vehicle 8 and a locking pin 18 therefore.

An embodiment of the instant invention includes an articulation lock 10 of vehicle 8 including conventional upper 12, lower 14, pad-eyes on a first articulated frame member 11 and a center pad-eye 16 on a second articulated frame member 13. The lock pin 18 is of sufficient length to pass through the upper pad-eye 12 and lower pad-eye 14 and is prevented from falling through the pad-eyes 12, 14, 16, by a removable retainer pin 30 inserted in a first through-hole 20 in the lock pin 18. In one embodiment, the lock pin 18 includes a second through-hole 22 like the first positioned to locate below the lower pad-eye 14 when the lock pin 18 is positioned in the pad-eyes 12, 14, 16. Conveniently, the lock pin 18 may incorporate tapered or chamfered 24 ends.

The removable retainer pin 30 may take many forms such as a conventional bolt and nut or other retaining means to prevent the lock pin from inadvertently falling through the pad-eyes 12, 14, 16, of the articulation lock 10. A useful and inexpensive retainer pin may be conveniently obtained as a commercial item frequently sold as a safety retainer clip 30 for an automotive trailer hitch having a resilient metal bail 32 that may be rotated about one enlarged end 34. The resilient bail may 32 be extended with hand force to permit insertion and withdrawal of the retainer pin 30 from a through-hole 20, 22 of the lock pin 18.

The through-hole 20, 22 of the lock pin 18 may be sized appropriately to receive a removable retainer pin 30. Likewise, the diameter of the lock pin 18 for heavy machinery, such as vehicle 8, is often of a size from 25 to 127 mm (1-5 inches) diameter as the size of the machine or vehicle 8 may require.

In use, the operator of vehicle 8 may advantageously insert the chamfered or tapered end 24 of the lock pin 18 in the upper pad-eye 12 with the retaining pin 30 in place to prevent the lock pin 18 from falling through the pad-eyes 12, 14, 16. In the event the pad-eyes 12, 14, 16, are not aligned to receive the lock pin 18 the operator may cautiously articulate the frame members 11, 13, to permit the influence of gravity to position the lock pin 18 as the pad-eyes 12, 14, 16, pass one another and reach alignment. Insertion of the inventive alignment pin is not materially different from the insertion of the alignment pins known in the art.

In the event the articulated frame members 11, 13, of vehicle 8 are aligned without transverse force on the alignment pin, the inventive lock pin 18 may be removed by lifting the lock pin 18 up ward in the manner for removal of known lock pins having fixed retaining features.

The lock pin 18 of the instant invention is useful in the event the articulated frame members 11, 13, of vehicle 8 are aligned such that a transverse force against the lock pin 18 prevents lifting the pin 18. Removal of the alignment pin 18 held in place by transverse force is facilitated by complete removal of the retaining pin 30. Then in the manner of lock pin 18 insertion, the operator may remove the lock pin 18 with the assistance of the influence of gravity by initiating back-and-forth steering movements of vehicle 8, and/or possibly moving the vehicle 8 forward and backward so as to arrive at a position of the articulated vehicle frame that assert no lateral force on the lock pin 18 such that it is free to drop from the pad-eyes 12, 14, 16.

In a further preferred embodiment, the retainer pin 30 or another fastener may be fastened to a lower through-hole 22 of the lock pin 18 before initiating efforts to remove a lock pin 18 held in place by lateral forces. The retainer pin or other fastener is then preferably tethered 36 to the vehicle 8 such as by a light chain, or cable. With the lock pin 18 thus connected to retainer pin 30, which in turn is tethered to the vehicle 8, the lock pin 18 may be easily retrieved by the operator as soon as the vehicle 8 articulates freely indicating that the lock pin 18 is free of the pad-eyes 12, 14, 16.

The utility of affixing the lock pin 18 through the lower through-hole 22 is enhanced by the fact that heavy machines, such as vehicle 8, are intended, and most often used, to move soil, rocks and other earth forms. Thus, were the lock pin 18 to fall from the pad-eyes 12, 14, 16, to the ground, it may be difficult to locate in disturbed terrain and involve an avoidable expenditure of time to find.

The lower through-hole 22 of the lock pin 18 may also be utilized while the heavy machine, such as vehicle 8, is in operation by fastening a second retainer pin in lower through-hole 22. Thus placed, a second lower retainer pin reduces the risk that the lock pin would work itself out of the pad-eyes 12, 14, 16, against the influence of gravity, and the associated potential loss of the lock pin 18 altogether at a heavy equipment work site.

Another feature of the invention is the use of the preferred retainer pin 30, including the bail 32 thereof to hold the lock pin 18 in a bracket on the machine or vehicle 8 when the lock pin 18 is not in place in the pad-eyes 12, 14, 16. When not in place on a machine or vehicle 8, or in a storage bracket, the resilient bail 32 of the preferred retaining pin 30 provides a convenient handle for manual carrying the lock pin 18 with the retaining pin 30 inserted through a through bore therein.

The invention claimed is:

1. A vehicle including:
    a first frame member that defines a first aperture having a first width;
    a second frame member that defines a second aperture having a second width, the second frame member pivotable about a hinge point relative to the first frame member;
    a lock assembly extending through the first and second apertures of the first and second frame members radially of the hinge point, the lock assembly being configured to prevent the second frame member from pivoting about the hinge point relative to the first frame member, the lock assembly including:
        a headless locking pin having a length extending from a first terminal end of the headless locking pin to a second terminal end of the headless locking pin, the length of the headless locking pin being sufficient to extend beyond at least one of the first and second frame members, and the headless locking pin having a maximum width along its length that is smaller than both the first and second widths of the first and second apertures;
        at least one through-hole in the locking pin in the length of the locking pin positioned beyond at least one of the first and second frame members; and
        a removable retainer pin adapted for the at least one through-hole;
    wherein the first frame member is coupled to a first ground engaging member and the second frame member is coupled to a second ground engaging member, the second frame member pivotable about the hinge point to adjust a position of the second ground engaging member relative to the first ground engaging member, the lock assembly being configured to lock the position of the second ground engaging member relative to the first ground engaging member.

2. The vehicle of claim 1, wherein the locking pin includes a second through-hole also positioned beyond the length of the first and second frame members.

3. The vehicle of claim 1, further comprising a resilient bail coupled to the removable retainer pin.

4. The vehicle of claim 1, further comprising a tether to attach the retainer pin to the vehicle.

5. The vehicle of claim 1, further comprising a tether to attach the retainer pin to at least one of the first and second frame members.

6. The vehicle of claim 1, wherein the lock assembly has a first configuration that resists removal of the lock assembly from the first and second frame members by gravitational force when the vehicle is in an upright position with the first and second ground engaging members contacting the ground, and a second configuration that permits removal of the lock assembly from the first and second frame members by gravitational force when the vehicle is in an upright position with the first and second ground engaging members contacting the ground.

7. The vehicle of claim 6, wherein the retainer pin rests above the first and second frame members in the first configuration to resist removal of the locking pin by gravitational force.

8. The vehicle of claim 1, wherein the lock assembly includes a first configuration in which the retainer pin is inserted through the at least one through-hole in the locking pin to resist removal of the locking pin from the first and second apertures of the first and second frame members by gravitational force, and a second configuration in which the retainer pin is removed from the at least one through-hole in the locking pin to permit removal of the locking pin from the first and second apertures of the first and second frame members by gravitational force.

9. A vehicle including:
a first frame member;
a first pad-eye coupled to the first frame member;
a second frame member, the second frame member pivotable about a hinge point relative to the first frame member;
a second pad-eye coupled to the second frame member;
a lock assembly extending through the first and second pad-eyes radially of the hinge point, the lock assembly configured to prevent the second frame member from pivoting about the hinge point relative to the first frame member, the lock assembly including:
  a locking pin that extends through the first and second pad-eyes and beyond at least one of the first and second pad-eyes and is configured to be inserted and removed from the first and second pad-eyes in the same direction;
  a removable retainer pin; and
  at least one through-hole located in an end of the locking pin, the through-hole sized to receive the retainer pin;
wherein the first frame member is coupled to a first ground engaging member and the second frame member is coupled to a second ground engaging member, the second frame member pivotable about the hinge point to adjust a position of the second ground engaging member relative to the first ground engaging member, the lock assembly being configured to lock the position of the second ground engaging member relative to the first ground engaging member.

10. The vehicle of claim 9, wherein the locking pin extends through the first and second pad-eyes in a direction parallel to a gravitational force.

11. The vehicle of claim 9, wherein, with the retainer pin received in the through-hole of the locking pin, the retainer pin rests against at least one of the first and second pad-eyes to prevent the locking pin from dropping through the pad-eyes.

12. The vehicle of claim 9, wherein the lock assembly further includes a second through-hole located in an opposite end of the locking pin from the at least one through-hole.

13. The vehicle of claim 9, wherein a bottom end of the locking pin projects beneath the first and second frame members, the bottom end of the locking pin including a second through-hole.

14. The vehicle of claim 9, wherein at least one of the retainer pin and the locking pin is tethered to the vehicle.

15. The vehicle of claim 9, wherein the lock assembly is configured for insertion between the first and second frame members by gravitational force when the vehicle is in an upright position with the first and second ground engaging members contacting the ground.

16. The vehicle of claim 9, wherein the removable retainer pin comprises an upper retainer pin that resists removal of the lock assembly by gravitational force, the vehicle further including a removable lower retainer pin that resists removal of the lock assembly against gravitational force.

* * * * *